United States Patent [19]

Syrinek

[11] Patent Number: 5,205,939
[45] Date of Patent: Apr. 27, 1993

[54] REMOVAL OF SILVER FROM AQUEOUS SYSTEMS

[75] Inventor: Allen R. Syrinek, Richmond, Tex.

[73] Assignee: Nalco Chemical Company, Naperville, Ill.

[21] Appl. No.: 909,519

[22] Filed: Jul. 6, 1992

[51] Int. Cl.$^5$ ............................................. C02F 1/62
[52] U.S. Cl. ................................. 210/727; 210/734; 210/912
[58] Field of Search ............... 210/726, 727, 733–735, 210/912, 729, 724

[56] References Cited

U.S. PATENT DOCUMENTS

| | | | |
|---|---|---|---|
| 3,284,393 | 11/1966 | Vaderhoff et al. | 524/801 |
| 3,624,019 | 11/1971 | Anderson et al. | 523/336 |
| 4,133,755 | 1/1979 | Tarao et al. | 210/688 |
| 4,578,195 | 3/1986 | Moore et al. | 210/912 |
| 4,731,187 | 3/1988 | Moriya et al. | 210/912 |
| 4,957,634 | 9/1990 | Bowers, Jr. | 210/912 |
| 4,971,775 | 11/1990 | Hoy et al. | 210/702 |

OTHER PUBLICATIONS

Nalco "Confidential Product Profile on Nalco 8154" PAC-1M Miscellaneous (Feb. 1989) Publication.
Nalco "Nalmet Heavy Metal Removal Program, Indusry Pofile", Nalco Chemical Co. Publication, (1989).
Nalco "Advance Technical Data Sheet for Nalmet 8154", Nalco Chemical Company (1989).

Primary Examiner—Peter Hruskoci
Assistant Examiner—Neil McCarthy
Attorney, Agent, or Firm—Robert A. Miller; John G. Premo

[57] ABSTRACT

High molecular weight cationic flocculents in combination with water soluble dithiocarbamates remove dissolved and colloidal silver from aqueous suspensions thereof.

6 Claims, No Drawings

REMOVAL OF SILVER FROM AQUEOUS SYSTEMS

FIELD OF THE INVENTION

The invention relates to the recovery of colloidal and dissolved silver from aqueous suspensions thereof using flocculents and water soluble dithiocarbamates.

INTRODUCTION

Silver mining and reclamation of silver from photographic emulsions, silver plating wastes and other industrial applications results in the production of waste aqueous systems which contain amounts of colloidal and dissolved silver. These waste streams, which contain primarily water and often times other undesirable contaminants, must be treated to reduce the silver content thereof to a very low level in order to make these waste streams suitable for disposal by addition to conventional waste treatment plants.

One method of reducing the silver content of aqueous waste process streams has been the utilization of water soluble flocculents and coagulants. These treatments are, in many instances, incapable of reducing the silver content of these waste process waters to an acceptably low levels, e.g. below 2 parts per million (ppm).

If it were possible to utilize a simple, effective chemical treatment which could treat waste aqueous systems containing both colloidal and dissolved silver which would reduce the silver content thereof to below 2 ppm, a valuable contribution to art would be afforded.

THE INVENTION

The invention is a process for removing dissolved and colloidal silver from an alkaline aqueous liquid. It comprises the sequential steps of:
a) treating the alkaline aqueous liquid with at least 3 ppm of a water soluble cationic polymer having a molecular weight of at least 500,000 to flocculate the colloidal silver;
b) filtering the flocculated alkaline aqueous liquid to form silver rich filtered solids and a filtrate;
c) treating the filtrate produced in step (b) with at least 10 parts per million of water soluble dithiocarbamate to react with the dissolved silver to form a colloidal dispersion of silver;
d) treating the filtrate produced in step (c) with at least 0.1 ppm of a water soluble cationic polymer to flocculate the colloidal silver, and then;
e) filtering the flocculated filtrate produced in step (d) to produce silver rich filtered solids and a filtrate having a reduced silver content.

While the above described process gives superior results in reducing the silver content of aqueous systems containing dissolved and colloidal silver, it has the drawback of requiring two filtrations to achieve the low level of silver reduction. In a preferred embodiment of the invention, it is possible to utilize the same active ingredients described above in a simpler process, whereby only one filtration is required. This preferred embodiment of the invention is a process for removing dissolved and colloidal silver from an alkaline aqueous liquid which comprises the sequential steps of:
a) treating the alkaline aqueous liquid with at least 10 parts ppm of a water soluble dithiocarbamate to react with the dissolved silver to form a colloidal dispersion of silver;
b) treating the alkaline aqueous liquid produced in step (a) with a least 0.1 ppm of a water soluble cationic polymer to flocculate the colloidal silver, and then;
c) filtering the flocculated alkaline aqueous liquid produced in step (b) to produce silver rich filtered solids and a filtrate having a reduced silver content.

THE WATER SOLUBLE CATIONIC FLOCCULENTS

The cationic flocculents used in the practice of this invention may be selected from a large number of cationic flocculents of the type used to treat waste systems. These usually are water soluble vinyl addition polymers. In most instances they are co-polymers with other soluble vinyl monomers. Polymers of diallyldimethylammonium chloride (hereafter DADMAC) gives superior results. This is particularly true, when they are in the form of copolymers with acrylamide and in certain instances acrylic acid. The copolymers may contain from 3 to 50 mole percent of DADMAC. The preferred DADMAC mole percent of these polymers is within the range of 10 to 30 mole percent. The polymers are preferably high molecular weight polymers, that is to say, they have a weight average molecular weight of at least 500,000 and preferably 1,000,000. In a most preferred embodiment of the invention the molecular weight should be in excess of 5,000,000. While the acrylamide-DADMAC copolymers represent a preferred species used in the practice of the invention, it is understood that in certain instances, DADMAC homopolymers, as well as copolymers of acrylamide, and acrylic acid with varying mole percents of quaternaryammonium acrylate esters may also be employed.

Due to the high molecular weight of the cationic flocculents normally used to practice the invention, in a preferred embodiment, it is convenient that these polymers be in the form of water-in-oil emulsions. These emulsions are well known and are convenient to use. They can be rapidly dissolved by adding a water soluble surfactant into water prior to the addition of a water-in-oil emulsion of the water soluble cationic flocculent. This causes the flocculent to rapidly go into solution. These emulsions and their ability to be rapidly dissolved is described in Vanderhoff U.S. Pat. No. 3,284,393 and Anderson et al. U.S. Pat. No. 3,624,019. The disclosures of these two U.S. patents are incorporated herein by reference. These patents also disclose a number of cationic polymers that may be used as described or modified and used in the practice of this invention. The amount of polymer contained in the above described emulsions may vary, with the typical amount ranging between 10–30 percent by weight.

THE WATER SOLUBLE DITHIOCARBAMATES

The water soluble dithiocarbamtes used in the practice of the invention are lower alkyl substituted dithiocarbamates. By the term, lower alkyl, is meant to include substituent groups which contain from one to four carbon atoms in an aliphatic grouping. The dithiocarbamates may be mono or dialkyl dithiocarbamates, such as methyldithiocarbamte, ethyldithiocarbamate, dimethyldithiocarbamate, which is a preferred material, as well as other dialkyl dithiocarbamates. An other group of dithiocarbamates that are useful are the so called alkylene bis dithiocarbamates. Exemplary of these compounds is ethylene bis dithiocarbamate.

The carbamates are utilized in their water soluble salt form, such as the alkali metal, e.g. sodium, ammonium and amine salt forms. The sodium salt form is preferred. A preferred water soluble dithiocarbamate composition comprises a blend of lower $C_1$-$C_4$ alkyl dithiocarbamates in combination with an alkylene bis dithiocarbamate. When this combination of dithiocarbamates is used they should be combined in a weight ratio of 1:2 to 2:1. A preferred ratio is 1:1. A preferred composition of the invention comprises a 1:1 weight ratio of dimethyl dithiocarbamate and ethylene bis dithiocarbamate The dithiocarbamates in the form of their alkali metal, ammonium or amine salts are water soluble. They may be utilized in the form of aqueous solutions whose concentration may vary as little as 5% up to the saturation solubility of particular carbamates used in preparing the solutions.

pH OF THE AQUEOUS SYSTEM TREATED BY THE INVENTION

The aqueous alkaline systems which contain the colloidal and dissolved silver that are most efficiently treated by the practices of the invention when the pH of the systems is adjusted. Since these systems are alkaline, the invention is capable of operating thereon over a wide pH range, e.g. greater than 7 up to about 14. In many instances, however, it is desirable to adjust high pH waters with a mineral acid such as hydrochloric or sulfuric acids to reduce pH within the range of slightly above 7 to about 12. A pH of between 8-10 usually improves the results achieved. The optimum pH for the practice of the invention is only determined by routine experimentation. It is to be understood, therefore, that as used herein and in the claims, that the expression "alkaline aqueous systems" not only includes alkaline systems as they occur or result from the processes which generate them, but it also includes the step of pH adjustment described above.

DOSAGE

The dosage of the water soluble cationic flocculent may be as little as 0.1 ppm, on an active polymer basis, to as much as several hundred ppm. Typically, the cationic flocculents are dosed at a range of about 3-50 with a more preferred range being between 10-30 ppm. It is understood that while these dosages are given as a guideline, only routine experimentation can determine those amounts necessary to optimize the process. In a similar fashion the dithiocarbamates may be dosed over a wide range of ppm by weight. Typically, the minimum dosage is about 10 ppm. It may be as high as 250 ppm. based on active dithiocarbamates. Good results often are achieved between 30-80 ppm. The dithiocarbamates' dosage often is proportional to the amount of silver present as dissolved silver. Therefore the above dosage levels are given as guidelines and are not meant to be definitive, since experimentation will dictate the minimum dosage.

EVALUATION OF THE INVENTION

The compositions evaluated are set forth hereafter:

COMPOSITION 1

| Ingredients | % by Weight |
| --- | --- |
| Sodium dimethyldithiocarbamate | 15 |
| Disodium ethylenebis (dithiocarbamate) | 15 |
| Water | 70 |

COMPOSITION 2

An acrylamide-38 mole % diallyldimethyl ammonium chloride copolymer having a weight average molecular weight of about 10,000,000. (Reduced Specific Viscosity of 8) in the form of a 28% by weight water-in-oil emulsion.

COMPOSITION 3

| Ingredients | % by Weight |
| --- | --- |
| 50% aqueous solution chlorhydrol | 28.6 |
| 27% aqueous solution ammonium chloride | 34.7 |
| 75% $H_3PO_4$ | 3.3 |
| Water | Balance |

COMPOSITION 4

50% Ferric Sulfate Solution.

TEST PROCEDURE

SCOPE

This is a simple test used to evaluate coagulants and flocculents. It is useful for comparison of the relative effectiveness of coagulant, flocculents, and ratios of coagulants and flocculents.

EQUIPMENT 4 oz. bottles
1 ml syringes
100 ml graduated cylinders
coagulant/flocculent additives
liquid to be tested,

PROCEDURE

1) Make 1% solutions of test additives. A 1 ml dose of solution is 100 ppm. (Some anionic flocculents must be used as 0.5% solutions because of high solution viscosity.)
2) Pour 100 ml aliquots of liquid to be tested.
3) Incrementally add a broad dosage range of additive. For example 5, 10, 20, 50, 100 ppm could be run. Look for a change in turbidity. When you see a change, narrow the dosage range to optimize the effect.
4) Test a series of additives with varying properties. For example a series of cationic flocculents with a different cationic charge could be evaluated.
5) Try similar additives to improve effectiveness.
6) The objective is to clear the test liquid as quickly and effectively as possible.

The source of silver containing water was a brown, turbid sample. The pH was measured at approximately 14. Atomic absorption analysis showed 55 ppm of silver to be present in this water.

The purpose of this evaluation was to remove silver from the aqueous suspension down to a level of 0.2 ppm or less.

Filtrations were performed with Buchner funnels and suction flasks attached to a water aspirator, or with minifilters which attached to syringes. No filter aid was required for either method.

EXAMPLES

A variety of flocculents, both cationic and anionic, were evaluated to determine which ones would clarify the water. Composition 2 was selected because it clarified the water and gave the best flocculation. Other cationics of approximately the same charge density did not perform as well. Anionic flocculents gave no observable precipitation.

Table 1 shows the dosage effect for Composition 2. The table is broken into two sections: one with no pH adjustment, and one with a pH adjusted to 8.3 with hydrochloric acid. For the high pH system, 400 ppm of Composition 2 gave the clearest water phase. For pH 8.3, 200 ppm gave the lightest color water. The water was not turbid, but did have a brownish color to it.

A sample of the filtered floc from the pH adjusted suspension treated with 200 ppm Composition 2 was dried and ashed. The ash was 41.5% of the dried floc. It did contain some sodium but the ash was estimated to be approximately 90% silver.

Silver analyses were run on the filtered water by atomic absorption. Table 2 shows the results from the silver content analyses. The table is broken into two sections: one for coarse filter paper, and one for 0.2 micron filter paper. Results were slightly better for the 0.2 micron filter showing 1.9 ppm of silver remaining in the water for 200 ppm of Composition 2 at a pH of 8.3 and 1.5 pm of silver for 400 ppm of Composition 2 with no pH adjustment. The blank showed about 55 ppm of silver.

Since the requirements of 0.2 ppm of silver was not met by simple flocculation and filtration of the silver particles, a secondary treatment was considered. Coprecipitation of soluble silver with Al and Fe were evaluated. Aluminum containing compounds, iron containing compounds, and a proprietary heavy metal removal compound were evaluated. Table 3 shows the results for silver content after secondary treatment. At 400 ppm of Composition 2 with no pH adjustment, the silver content could not be lowered below 1.1 ppm. However, for the pH adjusted sample which had been treated with 200 ppm Composition 2, Composition 1 was successful at removing the remaining silver. The best results were achieved with 100 ppm Composition 1. Silver content of 0.2 ppm was found in the water after filtration of this sample.

Subsequent tests in which the Composition 1 was added first, then the Composition 2, followed by a single filtration showed that 100 ppm of Composition 1 and 200 ppm Composition 2 were able to reduce the silver content to 0.2 ppm. This method required only one filtration.

DISCUSSION

At high pH, the suspended silver seems to be very stable and larger amounts of flocculent are required to remove the silver. As the pH is lowered to near neutral, less flocculent is required to remove the silver. Composition 2 at 200 ppm is capable of lowering the silver content to less than 2 ppm for pH adjusted and filtered sample. However, the remaining silver is assumed to be ionic and in solution not merely suspended. The Composition 1 precipitates this soluble silver so that it can be removed by filtration. Dosages for Composition 2, and especially the Composition 1 should be optimized for the amount and ionic nature of silver present under actual plant conditions since agitation, temperature, pH and residence time will affect these dosages.

TABLE 1

DOSAGE EFFECT FOR COMPOSITION 2

| Dosage | Effect |
|---|---|
| *No pH Adjustment* | |
| Blank | Brown, turbid, #12 |
| 10 ppm | Some Precipitation |
| 100 | Clearer than blank |
| 200 | Clearer than 100 ppm |
| 300 | Clearer than 200 ppm |
| 350 | Same as 300 ppm |
| 400 | Clearest |
| 500 | More suspended particles than 400 ppm |
| *pH Adjusted to 8.3\** | |
| 10 | Some precipitation |
| 100 | Clearer |
| 150 | Lighter than 100 ppm |
| 200 | Lightest color |
| 250 | Slightly more turbid than 200 ppm |
| 300 | More turbid than 200 ppm |

*pH adjusted with HCl

TABLE 2

Ag CONTENT IN FILTERED WATER AFTER TREATMENT WITH COMPOSITION 2

| TREATMENT | PPM |
|---|---|
| *COARSE FILTER* | |
| Blank | 56, 53 |
| 400 ppm Composition 2 | 2.2, 2.4 |
| 200 ppm Composition 2, pH 8.3 | 3.7, 2.8 |
| *0.2 MICRON FILTER* | |
| 200 ppm Composition 2, pH 8.3 | 1.9 |
| 400 ppm, no pH adj. | 1.5 |

TABLE 3

Ag CONTENT AFTER SECONDARY TREATMENT

| TREATMENT | PPM Ag |
|---|---|
| *400 PPM COMPOSITION 2, NO pH ADJUSTMENT* | |
| Blank | 1.5 |
| 10 ppm Composition 1 | 1.5 |
| 300 ppm Composition 1 | 1.3 |
| 10 ppm Composition 3 | 1.1 |
| 10 ppm Composition 4 | 1.3 |
| *200 PPM COMPOSITION 2, pH 8.3* | |
| Blank | 1.9 |
| 50 ppm Composition 1 | 0.5 |
| 100 ppm Composition 1 | 0.2 |
| 200 ppm, Composition 2 | <0.1 |

I claim:
1. A process for removing dissolved and colloidal silver from an alkaline aqueous liquid which comprises the sequential steps of:
 a) treating the alkaline aqueous liquid with at least 3 ppm of a water soluble cationic acrylamide copolymer which contains from 3 to 50 mole per-cent of diallyldimethyl ammonium chloride and has a molecular weight of at least 1,000,000 to flocculate the colloidal silver;
 b) filtering the flocculated alkaline aqueous liquid to form silver rich filtered solids and a filtrate;
 c) treating the filtrate produced in step (b) with at least 10 ppm of a water soluble $C_1$–$C_4$ alkyl substituted dithiocarbamate to react with the dissolved silver to form a colloidal suspension of silver;

d) treating the filtrate produced in step (c) with at least 0.1 ppm of said water soluble cationic copolymer to flocculate the colloidal silver, and then;

e) filtering the flocculated filtrate produced in step (d) to produce silver rich filtered solids and a filtrate having a silver content of less than 2 ppm.

2. The process of claim 1 where the $C_1$-$C_4$ alkyl substituted dithiocarbamate is a blend of dimethyldithiocarbamate and ethylene dithiocarbamate combined in a weight ratio of from 1:2 to 2:1.

3. The process of claim 2 where the weight ratio is 1:1.

4. A process for removing dissolved and colloidal silver from an alkaline aqueous liquid which comprises the sequential steps of:

a) treating the alkaline aqueous liquid with at least 10 ppm of a water soluble $C_1$-$C_4$ alkyl substituted dithiocarbamate to react with the dissolved silver to form a colloidal dispersion of silver;

b) treating the alkaline aqueous liquid produced in step (a) with at least 0.1 ppm of a water soluble cationic acrylamide copolymer which contains from 3 to 50 mole per-cent of diallyldimethyl ammonium chloride and has a molecular weight of at least 1,000,000 to flocculate the colloidal silver, and then;

c) filtering the flocculated alkaline aqueous liquid produced in step (b) to produce silver rich filtered solids and a filtrate having a silver content below 2 ppm.

5. The process of claim 4 where the $C_1$-$C_4$ alkyl substituted dithiocarbamate is a blend of dimethyldithiocarbamate and ethylene dithiocarbamate combined in a weight ratio of from 1:2 to 2:1.

6. The process of claim 5 where the weight ratio is 1:1.

* * * * *